(12) United States Patent
Yamamoto et al.

(10) Patent No.: US 11,029,747 B2
(45) Date of Patent: Jun. 8, 2021

(54) ELECTRONIC APPARATUS AND CONTROL METHOD FOR ADJUSTING PRIORITY OF AN APPLICATION BASED ON ACTIVATIONS

(71) Applicant: PANASONIC INTELLECTUAL PROPERTY MANAGEMENT CO., LTD., Osaka (JP)

(72) Inventors: Tetsuji Yamamoto, Osaka (JP); Takehiko Yasuda, Kanagawa (JP); Osamu Nishimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 16/368,255

(22) Filed: Mar. 28, 2019

(65) Prior Publication Data
US 2019/0302874 A1 Oct. 3, 2019

(30) Foreign Application Priority Data

Mar. 30, 2018 (JP) .............................. JP2018-067969

(51) Int. Cl.
*G06F 1/32* (2019.01)
*G06F 1/3234* (2019.01)
(Continued)

(52) U.S. Cl.
CPC .......... *G06F 1/3275* (2013.01); *G06F 1/3225* (2013.01); *G06F 1/3228* (2013.01); *G06F 1/3287* (2013.01)

(58) Field of Classification Search
None
See application file for complete search history.

(56) References Cited

U.S. PATENT DOCUMENTS

| 2006/0212727 A1* | 9/2006 | Judge .................... G06F 1/3203 |
| | | 713/300 |
| 2007/0180187 A1 | 8/2007 | Olson et al. |

(Continued)

FOREIGN PATENT DOCUMENTS

| JP | 11-282587 | 10/1999 |
| JP | 2009-525555 | 7/2009 |

(Continued)

OTHER PUBLICATIONS

Japanese Office Action dated Mar. 17, 2020 issued in Japanese patent application No. 2018-067969.

(Continued)

*Primary Examiner* — Danny Chan
(74) *Attorney, Agent, or Firm* — Greenblum & Bernstein, P.L.C.

(57) ABSTRACT

The time required for transition from an on-state to a suspend state is reduced. An electronic apparatus includes: a memory and a memory; a current control unit that performs a control to shut off supply of current to the memory; and a memory management unit that allocates a memory region in either the memory or the memory based on preference information indicating a memory region that needs to be preferentially allocated in the memory. For example, the preference information includes association with a first priority as a degree at which a memory region to be used by an application needs to be preferentially allocated in the memory, and when receiving a request of allocation of the memory region from the application, the memory management unit more preferentially allocates the memory region in the memory as the first priority associated with the application in the preference information is higher.

9 Claims, 17 Drawing Sheets

Before adjustment (a)

| Region | Priority | Memory for allocation |
|---|---|---|
| Application A1 | 100 | M1 |
| Application A2 | 45 | M2 |
| Application A3 | 55 | M1 |
| Application A4 | 30 | M2 |
| Application A5 | 20 | M2 |
| Driver D1 | 90 | M1 |
| Driver D2 | 10 | M2 |

(b) | Threshold | 50 |

After adjustment (c)

| Region | Number of times activated | Priority | Memory for allocation |
|---|---|---|---|
| Application A1 | 140 | 114.0 | M1 |
| Application A2 | 210 | 66.0 | M1 |
| Application A3 | 15 | 56.5 | M2 |
| Application A4 | 12 | 31.2 | M2 |
| Application A5 | 21 | 22.1 | M2 |
| Driver D1 | 140 | 104.0 | M1 |
| Driver D2 | 132 | 23.2 | M2 |

(d) | Threshold | 59.6 |

(51) Int. Cl.
  *G06F 1/3287* (2019.01)
  *G06F 1/3228* (2019.01)
  *G06F 1/3225* (2019.01)

(56) References Cited

U.S. PATENT DOCUMENTS

| | | | |
|---|---|---|---|
| 2007/0214349 A1* | 9/2007 | Gu | G06F 1/3246 713/2 |
| 2012/0117364 A1* | 5/2012 | Rosenquist | G06F 1/3203 713/2 |
| 2013/0138900 A1 | 5/2013 | Ishihara et al. | |
| 2013/0198540 A1* | 8/2013 | Lee | G06F 1/3206 713/320 |
| 2014/0181558 A1* | 6/2014 | Taha | G06F 12/0238 713/323 |
| 2014/0344599 A1* | 11/2014 | Branover | G06F 1/3287 713/323 |
| 2015/0153810 A1* | 6/2015 | Sasidharan | G06F 1/329 713/320 |
| 2016/0246348 A1* | 8/2016 | Ambapuram | G06F 1/329 |
| 2017/0228012 A1* | 8/2017 | Shirota | G06F 1/3275 |
| 2017/0249247 A1* | 8/2017 | Nishino | G06F 3/0619 |

FOREIGN PATENT DOCUMENTS

| | | |
|---|---|---|
| JP | 2010-191951 A | 9/2010 |
| JP | 2013-109707 A | 6/2013 |
| JP | 2013-228988 | 11/2013 |
| WO | 2007/090195 | 8/2007 |

OTHER PUBLICATIONS

Office Action dated Mar. 29, 2021 for German patent application No. 102019107868.7 and corresponding English translation.

* cited by examiner

| Region | Priority |
|---|---|
| Application A1 | 100 |
| Application A2 | 40 |
| Application A3 | 70 |
| Application A4 | 30 |
| Application A5 | 20 |
| Driver D1 | 90 |
| Driver D2 | 0 |

(b)

| Threshold | 60 |
|---|---|

FIG. 6

| Region | Files used |
|---|---|
| Application A1 | /bin/appi1 |
| | /lib/libc.so |
| | /lib/libpthread.so |
| | /data/meter.dat |
| Application A2 | /bin/appi2 |
| | /lib/libc.so |
| | /lib/libaudio.dat |
| | /data/audio.dat |
| Application A3 | /bin/appi3 |
| | /lib/libc.so |
| | /lib/libpthread.so |
| | /data/map.dat |

| File | Priority |
|---|---|
| /bin/appi1 | 80 |
| /bin/appi2 | 65 |
| /bin/appi3 | 40 |
| /lib/libc.so | 100 |
| /lib/libpthread.so | 90 |
| /lib/libaudio.so | 60 |
| /data/meter.dat | 70 |
| /data/audio.dat | 30 |
| /data/map.dat | 10 |

(b)

| Threshold | 60 |
|---|---|

FIG. 16

| Date | Start time | End time |
|---|---|---|
| 2018/2/1 | 6:04 | 20:04 |
| 2018/2/2 | 5:55 | 20:10 |
| 2018/2/3 | 6:00 | 19:55 |
| 2018/2/4 | 5:58 | 20:02 |
| 2018/2/5 | 6:02 | 19:55 |
| 2018/2/6 | 6:05 | 19:58 |

ELECTRONIC APPARATUS AND CONTROL METHOD FOR ADJUSTING PRIORITY OF AN APPLICATION BASED ON ACTIVATIONS

CROSS REFERENCE TO RELATED APPLICATION

The present application is based on and claims priority of Japanese Patent Application No. 2018-067969 filed on Mar. 30, 2018. The entire disclosure of the above-identified application, including the specification, drawings and claims is incorporated herein by reference in its entirety.

FIELD

The present disclosure relates to an electronic apparatus and a control method.

BACKGROUND

Conventionally, there is a technology of compressing the data stored in a RAM and shutting off the supply of current to a RAM that does not need to hold storage data (see Patent Literature 1, for example).

CITATION LIST

Patent Literature

[Patent Literature 1] Japanese Unexamined Patent Application Publication No. 11-282587

SUMMARY

Technical Problem

However, there is a room for improvement in the technology described in Patent Literature 1

Hence, the present disclosure provides an electronic apparatus and the like that can be further improved.

Solution to Problem

An electronic apparatus in accordance with an aspect of the present disclosure includes: a plurality of volatile memories that include a first memory and a second memory; a current control unit that performs a control to shut off supply of current to the second memory; and a memory management unit that allocates a memory region in either the first memory or the second memory based on preference information indicating a memory region that needs to be preferentially allocated in the first memory.

These general and specific aspects may be implemented to a system, a method, an integrated circuit, a computer program, or a computer-readable recording medium such as a Compact Disc-Read Only Memory (CD-ROM), or may be any combination of them. Furthermore, the recording medium may be a non-transitory recording medium.

Advantageous Effects

The electronic apparatus according to the present disclosure can be further improved.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

FIG. 4 is an explanatory diagram showing a priority of a memory region for each application and a threshold according to Embodiment 1.

FIG. 6 is a correspondence table showing correspondence between applications and files to be used by the applications according to Embodiment 1.

FIG. 7 is a correspondence table showing correspondence between files and priorities of the files according to Embodiment 1.

FIG. 16 is an explanatory diagram showing a history of operating times of an electronic apparatus according to Embodiment 4.

Figure 1:
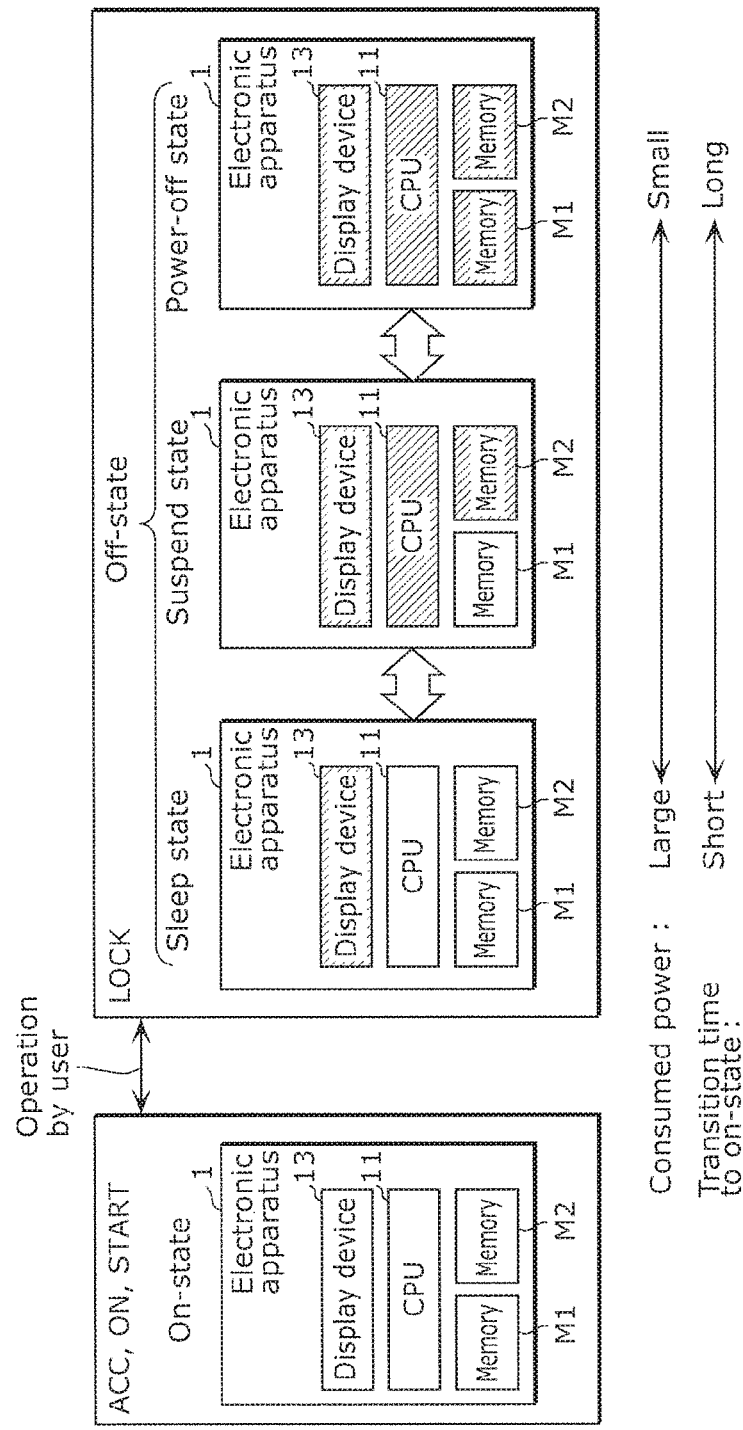
FIG. 1 is an explanatory diagram for operation modes of an electronic apparatus according to Embodiment 1.

DESCRIPTION OF EMBODIMENTS (Observation for the Present Disclosure)

The inventors of the present disclosure have found that a display apparatus related to the technology described in the "Background" has the following problems.

Conventionally, there is a Suspend to RAM (Random Access Memory) technology of curbing power consumption at the time of standby of a computer. The Suspend to RAM technology holds information on a DRAM (Dynamic Random Access Memory), and then shuts off the supply of current to parts other than the DRAM, for the standby (suspend). Thereby, it is possible to restart a process at high speed, at the time of the next activation, while reducing consumed power at the time of the standby.

Moreover, for example, it is possible to further reduce the consumed power at the time of the standby, by shutting off the supply of current to a DRAM on one channel of two DRAM channels.

However, in the technology described in Patent Literature 1, the transition from an on-state to a suspend state requires time for processes such as the compression of storage data and the calculation of storage capacity. Therefore, there is a problem in that it is not possible to perform the transition to the suspend state in a short time.

Hence, the present disclosure has an object to provide an electronic apparatus and the like that reduce the time required for the transition from the on-state to the suspend state.

In accordance with an aspect of the present disclosure, an electronic apparatus includes: a plurality of volatile memories that include a first memory and a second memory; a current control unit that performs a control to shut off supply of current to the second memory; and a memory management unit that allocates a memory region in either the first memory or the second memory based on preference information indicating a memory region that needs to be preferentially allocated in the first memory.

According to the above aspect, based on the preference information, the electronic apparatus can preferentially allocate the memory region that needs to be allocated in the first memory, to which the supply of the current is not shut off, in the first memory, and the memory region that needs to be allocated in the first memory is restrained from being allocated in the second memory. The shut-off of the supply of the current to the second memory requires time for a process of copying the data stored in the second memory to the first memory, and the like. Therefore, when the supply of the current to the second memory is shut off and the transition to the suspend state is performed, it is possible to reduce the time required for the transition from the on-state to the suspend state, compared to a case where the memory region that needs to be allocated in the first memory is allocated in the second memory. Thus, the electronic apparatus can reduce the time required for the transition from the on-state to the suspend state.

For example, it is also possible that the preference information includes association between an application and a first priority, the application operating using the plurality of the volatile memories, the first priority being a degree at which a memory region to be used by the application needs to be preferentially allocated in the first memory; and that when the memory management unit receives a request of allocation of the memory region from the application, the memory management unit more preferentially allocates the memory region in the first memory as the first priority associated with the application in the preference information is higher.

According to the aspect, the electronic apparatus allocates, in the first memory, the memory region that needs to be preferentially allocated in the first memory, using the priority determined for each application. Thus, the electronic apparatus can reduce the time required for the transition from the on-state to the suspend state, by controlling the allocation of the memory region for each application.

For example, it is further possible that the memory management unit further acquires a frequency at which the application is activated, and adjusts the first priority to a higher priority as the frequency acquired is higher.

According to the above aspect, the electronic apparatus can allocate, in the first memory, the memory region that needs to be preferentially allocated in the first memory, using the priority adjusted depending on the frequency at which the application is activated.

For example, it is further possible that the preference information includes association between a file and a second priority, the file being placed in the plurality of the volatile memories, the second priority being a degree at which a memory region in which the file is placed needs to be preferentially allocated in the first memory; and that when the memory management unit receives a request of allocation of the memory region in which the file needs to be placed, the memory management unit more preferentially allocates the memory region in the first memory as the second priority associated with the file in the preference information is higher.

According to the above aspect, the electronic apparatus allocates, in the first memory, the memory region that needs to be preferentially allocated in the first memory, using the priority determined for each file. Thus, the electronic apparatus can reduce the time required for the transition from the on-state to the suspend state, by controlling the allocation of the memory region for each file.

For example, it is further possible that the memory management unit copies data stored in the second memory, to the first memory, before the current control unit shuts off the supply of the current to the second memory.

According to the above aspect, when the electronic apparatus shuts off the supply of the power to the second memory and transitions from the on-state to the suspend state, the electronic apparatus copies the data stored in the second memory, to the first memory, and therefore, the data stored in the second memory is also maintained after the suspend state. Further, if the data that is desired to be maintained after the suspend state has been already allocated in the first memory based on the preference information, there is also an effect to reduce the time required for the above copy. Thus, the electronic apparatus can maintain a larger volume of data after the suspend state, and can further reduce the time required for the transition from the on-state to the suspend state.

For example, it is further possible that when the memory management unit allocates the memory region across two or more non-volatile memories including the second memory of the plurality of the volatile memories, the memory management unit copies data stored in a partial region, to the first memory, before the current control unit shuts off the supply of the current to the second memory, the partial region being a region of the memory region allocated and being included in the second memory.

According to the above aspect, the electronic apparatus can maintain the memory region allocated across the two or more non-volatile memories including the second memory, after the suspend state. Thus, the electronic apparatus can maintain the memory region allocated across the two or more non-volatile memories, after the suspend state, and can reduce the time required for the transition from the on-state to the suspend state. Further, the copy of the data may be performed by DMA (Direct Memory Access). Thereby, the processing load on a CPU decreases, allowing the reduction in the time required for an activation process.

For example, it is further possible that the current control unit further performs a control to shut off supply of current to a controlled hardware device, the controlled hardware device being a previously determined hardware device of one or more hardware devices included in the electronic apparatus; and the memory management unit further stores state information in the first memory, before the current control unit shuts off the supply of the current to the controlled hardware device, the state information indicating a state of a driver that controls the controlled hardware device, and copies the state information to the driver, after the current control unit restores the supply of the current to the controlled hardware device.

According to the above aspect, when the electronic apparatus shuts off the supply of the current to the hardware device and thereafter restores the supply of the current to the hardware device, the electronic apparatus can maintain the state before the shut-off. Thus, the electronic apparatus can maintain the state of the hardware device after the suspend state, and can reduce the time required for the transition from the on-state to the suspend state.

For example, it is further possible that the memory management unit further stores completion information in the first memory, before the current control unit shuts off the supply of the current to the controlled hardware device, the completion information indicating completion of the storing of the state information, and copies the state information to the driver when it is judged that the completion information is stored in the first memory, after the current control unit restores the supply of the current to the controlled hardware device.

According to the above aspect, the electronic apparatus judges whether the process of the transition to the suspend state is normally completed. When the process is normally completed, the electronic apparatus performs the activation in a short time using the information stored in the first memory, and when the process is not normally completed, the electronic apparatus performs the activation using an ordinary activation process. Therefore, even when the process for the transition from the on-state to the suspend state cannot be normally completed, the electronic apparatus can reduce the time required for the transition from the on-state to the suspend state, while allowing a normal activation after that.

For example, it is further possible that the memory management unit further stores partial completion information in the first memory whenever the memory management unit stores state information in the first memory, before the current control unit shuts off the supply of the current to the controlled hardware device, the state information indicating states of one or more drivers of a plurality of the drivers, the partial completion information indicating completion of the storing of the state information; and that the memory management unit refers to the partial completion information stored in the first memory, (a) returns the state information to a driver that is of the plurality of the drivers and for which the state information is stored in the first memory, and (b) initializes a driver that is of the plurality of the drivers and for which the state information is not stored in the first memory, after the current control unit restores the supply of the current to the controlled hardware device.

According to the above aspect, the electronic apparatus judges whether processes of the transition to the suspend state are normally completed at a plurality of time points. For a process that is normally completed, the electronic apparatus recovers the state of the hardware device in a short time using the information stored in the first memory, and for a process that is not normally completed, the electronic apparatus performs the activation using an ordinary activation process. Therefore, even when there is a process that cannot be normally completed in the processes for the transition from the on-state to the suspend state, the electronic apparatus can reduce the time required for the transition from the on-state to the suspend state, while activating only the process using the ordinary activation process.

For example, it is further possible that the electronic apparatus further comprises an operation unit that receives an operation to cause the electronic apparatus to transition from an off-state to an on-state, from a user; the memory management unit further estimates an estimated on time point, the estimated on time point being a time point when the electronic apparatus transitions from the off-state to the on-state after a present time point; and the current control unit further performs the control to shut off the supply of the current to the second memory, when a time length from the present time point to the estimated on time point is longer than a predetermined length, and performs a control to restore the supply of the current to the second memory, when the time length from the present time point to the estimated on time point is shorter than a predetermined length.

According to the above aspect, when it is estimated that the activation of the electronic apparatus is maintained in the suspend state for a relatively long time, the electronic apparatus adopts a power-off state once, and thereby, reduces consumed power. Further, since the electronic apparatus adopts the power-off state once, even if an application has a defect such as memory leak, it is possible to restrain the influence thereof and to normally perform an operation after that. Therefore, the electronic apparatus can further reduce the consumed power, and can reduce the time required for the transition from the on-state to the suspend state while avoiding the influence of the memory leak or the like.

In accordance with another aspect of the present disclosure, a control method for an electronic apparatus includes a plurality of volatile memories that include a first memory and a second memory, the control method including: performing a control to shut off supply of current to the second memory; and allocating a memory region in either the first memory or the second memory based on preference information indicating a memory region that needs to be preferentially allocated in the first memory.

Thereby, the control method produces the same advantageous effects as the electronic device.

In accordance with still another aspect of the present disclosure, a program causes a computer to execute the above-described control method.

Thereby, the program produces the same advantageous effects as the electronic device.

These general and specific aspects may be implemented to a system, a method, an integrated circuit, a computer program, or a computer-readable recording medium such as a Compact Disc-Read Only Memory (CD-ROM), or may be any combination of them.

Hereinafter, certain exemplary embodiments are described in greater detail with reference to the accompanying Drawings.

It should be noted that all the embodiments described below are generic and specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

Embodiment 1

In the embodiment, an electronic apparatus that reduces the time required for the transition from the on-state to the suspend state will be described.

FIG. 1 is an explanatory diagram for operation modes of an electronic apparatus 1 according to the embodiment. The electronic apparatus 1 is an infotainment system including a navigation device for a vehicle, for example, but without being limited to this, may be a computer including a RAM, specifically, a personal computer, a smartphone, or the like.

As shown in FIG. 1, the electronic apparatus 1 includes a CPU (Central Processing Unit) 11, a display device 13, and memories M1, M2 that are volatile memories. Each constituent element is driven by current that is supplied. The function of each constituent element will be described later in detail.

The electronic apparatus 1 transitions mutually between an on-state and an off-state, based on an operation by a user. The on-state is a state where the electronic apparatus 1 is working, and the off-state is a state where the electronic apparatus 1 is not working. For example, the on-state and off-state of the electronic apparatus 1 coordinate with the state of the vehicle. In the case where the state of the vehicle is expressed as "LOCK", "ACC (accessory)", "ON", or "START", the electronic apparatus 1 coordinates such that the electronic apparatus 1 is in the off-state when the vehicle is in the "LOCK" state and the electronic apparatus 1 is in the on-state when the vehicle is in the state of "ACC (accessory)", "ON", or "START".

In the on-state, current is supplied to the CPU 11, the display device 13, and the memories M1, M2.

In the off-state, the supply of the current to some or all of the constituent elements of the electronic apparatus 1 is shut off. The off-state is further subdivided into three states: a sleep state, a suspend state, and a power-off state.

In the sleep state, the supply of the current to the display device 13 is shut off, and the supply of the current to the CPU 11 and the memories M1, M2 is maintained.

In the suspend state, the supply of the current to the display device 13, the CPU 11, and the memory M2 is shut off, and the supply of the current to the memory M1 is maintained.

In the power-off state, the supply of the current to the display device 13, the CPU 11, and the memories M1, M2 is shut off.

Among the three states included in the off-state, the consumed power of the electronic apparatus 1 is largest in the sleep state, and is smallest in the power-off state. Meanwhile, the time required for the transition to the on-state is shortest in the sleep state, and is longest in the power-off state.

Hence, when the vehicle is in the "LOCK" state and is not used by the user, the electronic apparatus 1 adopts the suspend state. Thereby, the electronic apparatus 1 can maintain a state allowing a short-time transition to the on-state, while reducing the consumed power.

However, the transition from the on-state to the suspend state sometimes requires a long time depending on memory regions that are placed in the memories M1, M2. Hence, the electronic apparatus 1 devises memory regions that are placed in the memory M1, and thereby, can reduce the time required for the transition from the on-state to the suspend state.

A configuration of the electronic apparatus 1 will be described below in detail.

Figure 2:
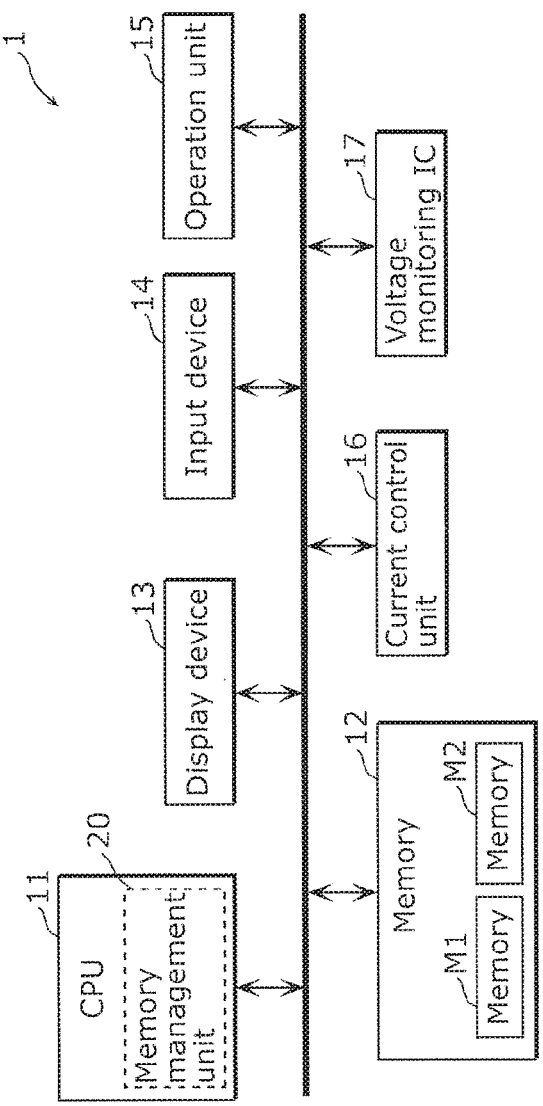
FIG. 2 is a block diagram showing a configuration of the electronic apparatus according to Embodiment 1.

FIG. 2 is a block diagram showing the configuration of the electronic apparatus 1 according to the embodiment.

As shown in FIG. 2, the electronic apparatus 1 includes a CPU 11, a memory 12, a display device 13, an input device 14, an operation unit 15, a current control unit 16, and a voltage monitoring IC (Integrated Circuit) 17.

The CPU 11 is a processor that executes predetermined programs using the memory 12. The CPU 11 realizes the function of a memory management unit 20 by executing predetermined programs. Further, the CPU 11 operates applications by executing predetermined programs. Here, examples of the applications include vehicle navigation, music playback, radio receiving and playback, speech recognition, and hands-free communication.

The memory 12 is a volatile memory that is used as a work area when the CPU 11 executes programs. The memory 12 includes a plurality of volatile memories. Here, a case where the memory 12 includes memories M1, M2 that are two volatile memories will be described, but the present disclosure is not limited to this.

In the suspend state, for one of the two volatile memories, the current to be supplied is shut off or restored through a control by the current control unit 16. In contrast, for the other of the two volatile memories, the above control by the current control unit 16 is not performed. The memory for which the control by the current control unit 16 is performed is the memory M2, and the memory for which the above control is not performed is the memory M1.

The display device 13 is a display device that displays images. For example, the display device 13 is a liquid crystal display or an organic EL (Electro-Luminescence) display.

The input device 14 is an input interface device that receives the input of the operation from the user. For example, the input device 14 is a touch pad, a keyboard, or a mouse. Further, the input device 14 and the display device 13 may be realized as a touch panel.

The operation unit 15 receives the user's operation for the transition between the on-state and the off-state. For example, as the above operation, the operation unit 15 receives an operation with a key of the vehicle for changing the state of the vehicle, or an operation of depressing a button.

The current control unit 16 is a control unit that controls the drive current for the memory M2. The current control unit 16 controls the shut-off and restoration of the supply of the current that is necessary for the drive of the memory M2. Further, the current control unit 16 controls the shut-off and restoration of the supply of the current to the display device 13, the input device 14, and other hardware devices (not illustrated). Examples of the other hardware devices include a UART (Universal Asynchronous Receiver/Transmitter). The hardware device for which the current control unit 16 controls the shut-off and restoration of the supply of the current is also referred to as a controlled hardware device.

The voltage monitoring IC 17 is an IC that monitors the voltage of a power receiving terminal of the memory M1. Specifically, in the suspend state, the voltage monitoring IC 17 monitors the voltage of the power receiving terminal of the memory M1, and outputs whether or not the voltage of the power receiving terminal has been maintained in an appropriate range from the beginning of the suspend state to the present time point, as a voltage value. The appropriate range is a range of the voltage value that is appropriate for the memory M1 to normally hold data, and for example, is 1.05 V to 1.15 V.

The memory management unit 20 is a function that is realized when the CPU 11 executes a predetermined program. The memory management unit 20 allocates the memory region in either the memory M1 or the memory M2, based on preference information indicating a memory region that needs to be preferentially allocated in the memory M1. Specifically, the memory management unit 20 receives a request of a memory allocation from an application that operates in the electronic apparatus 1, and performs the memory allocation by allocating a memory region to be used by the application as the requestor, in response to the request. At this time, the memory management unit 20 allocates the memory region in either the memory M1 or the memory M2, based on the preference information. Specific examples of the preference information will be described later. The above application also includes a driver as software that controls hardware, and software that operates as one function of an OS (Operating System).

Further, the memory management unit 20 performs processes such as the copy of storage data in the memories M1, M2, at the time of the transition between the on-state and the suspend state. When the operation unit 15 receives the operation of the transition from the "ACC" state to the "LOCK" state, the memory management unit 20 performs a process of causing the electronic apparatus 1 to transition from the on-state to the suspend state. Further, when the operation unit 15 receives the operation of the transition from the "LOCK" state to the "ACC" state, the memory management unit 20 performs a process of causing the electronic apparatus 1 to transition from the suspend state to the on-state. The memory management unit 20 copies the data stored in the memory M2, to the memory M1, before the current control unit 16 shuts off the supply of the current to the memory M2. These processes will be described later in detail.

Further, the memory management unit 20 stores state information indicating the state of the driver that controls hardware, in the memory M1, before the current control unit 16 shuts off the supply of the current to the hardware device. In that case, the memory management unit 20 copies the state information stored in the memory M1, to the driver, after the current control unit 16 restores the supply of the current to the hardware device.

Figure 3:
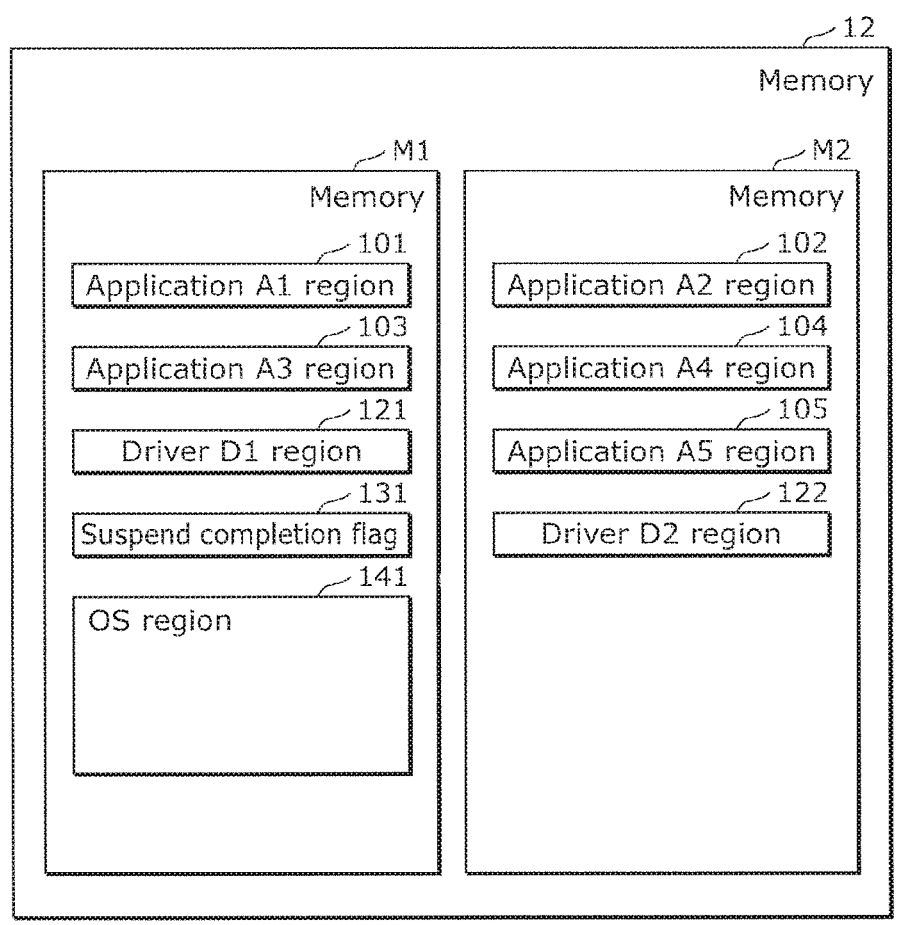
FIG. 3 is an explanatory diagram for memory regions in the electronic apparatus according to Embodiment 1.

FIG. 3 is an explanatory diagram for memory regions in the electronic apparatus 1 according to the embodiment. FIG. 3 shows memory regions that are allocated for applications and the like by the memory management unit 20.

In an example shown in FIG. 3, a region 101 for an application A1, a region 103 for an application A3, a region 121 for a driver D1, a suspend completion flag 131, and an OS (Operating System) region 141 are allocated in the memory M1. Further, a region 102 for an application A2, a region 104 for an application A4, a region 105 for an application A5, and a region 122 for a driver D2 are allocated in the memory M2.

An example of use of a priority for each application and an example of use of a priority for each file will be described as allocation methods for the memory region using the preference information.

(1) Example of Use of Priority for Each Application

In this example, the preference information includes association between an application that operates using the memory 12 and a first priority that is a degree at which a memory region to be used by the application needs to be preferentially allocated in the memory M1. In that case, when the memory management unit 20 receives the request of the allocation of the memory region from the application, the memory management unit 20 more preferentially allocates the memory region in the memory M1 as the first priority associated with the application in the preference information is higher. More specifically, the memory management unit 20 allocates a memory region for an application having a priority equal to or higher than a predetermined threshold, in the memory M1, and allocates a memory region for an application having a priority lower than the predetermined threshold, in the memory M2.

FIG. 4 is an explanatory diagram for the priority of the memory region for each application and the threshold according to the embodiment. This priority corresponds to the first priority.

In FIG. 4, (a) shows the priority for each application that can operate in the electronic apparatus 1. Here, as an example, the priority is expressed as an integer value in a range of 0 to 100. The highest priority is 100, and the lowest priority is 0.

For example, the priority of the application A1 is 100, and the priority of the application A2 is 40. Here, the drivers, each of which is software to control hardware, can be handled similarly to the applications. For example, the priority of the driver D1 is 90, and the priority of the driver D2 is 0 (zero).

Further, (b) in FIG. 4 shows that the threshold of the priority is 60.

When the priority and the threshold are set in this way, the memory management unit 20 performs the memory region allocation shown in FIG. 3.

The priority for each application may be adjusted based on the number of times activated for each application. In other words, the memory management unit 20 may acquire a frequency at which each application is activated, and may adjust the first priority to a higher priority as the acquired frequency is higher. Here, for example, the frequency can be expressed as the number of times activated in a predetermined time. As the predetermined time, for example, about one week to four weeks can be employed.

The priority for each application may be adjusted based on the use time for each application. The memory management unit 20 may acquire an accumulated time resulting from accumulating the time from the activation to the termination for each application, and may adjust the first priority to a higher priority as the acquired accumulated time is longer. In the case of assuming a user for which the frequency of the use of the vehicle is relatively low, the priority can be appropriately determined by the adjustment with the use time for each application rather than by the adjustment with the number of times activated for each application.

Figure 5:
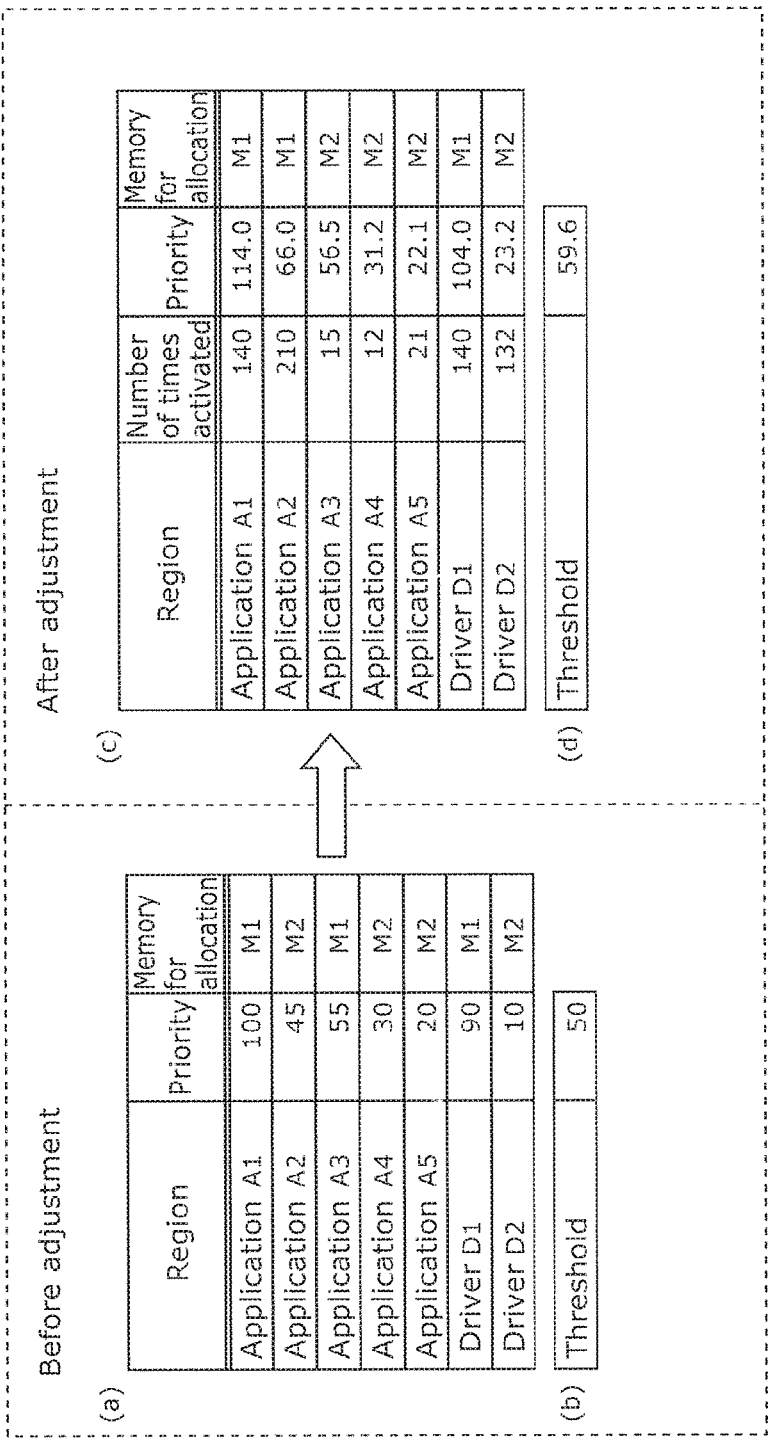
FIG. 5 is an explanatory diagram showing an adjustment method for the priority according to Embodiment 1.

FIG. 5 is an explanatory diagram showing an adjustment method for the priority according to the embodiment. The priority for each application shown in FIG. 4 can be adjusted based on the frequency of the activation of the application. In this adjustment, the first priority is set to a higher priority as the frequency is higher. In other words, the first priority is adjusted to a lower priority as the frequency is lower.

In FIG. 5, (a) and (b) show a previously determined priority for each application and a previously determined threshold, respectively. The priority and the threshold are also referred to as the priority and threshold before the adjustment.

Further, (a) in FIG. 5 shows whether the memory in which the memory management unit 20 allocates the memory region for the application or the driver is the memory M1 or the memory M2. For example, it is shown that the memory management unit 20 allocates the memory region for the application A1 in the memory M1 and allocates the memory region for the application A2 in the memory M2.

In FIG. 5, (c) and (d) show the number of times activated in a predetermined time that indicates the frequency for each application by the memory management unit 20, the priority after the adjustment, and the threshold after the adjustment, respectively.

As an example, the priority B after the adjustment is calculated using the priority A before the adjustment and the number N of times activated, as follows.

$$B=A+N\times 0.1$$

Further, as an example, the threshold U after the adjustment is calculated using the threshold T before the adjustment, the total value M of the numbers of times activated of the applications and the drivers, and the number L of regions to be managed, as follows.

$$U=T+M/L\times 0.1$$

Then, using the priority for each application and the threshold after the above adjustment, the memory management unit 20 allocates the memory region for the application A1 in the memory M1, and allocates the memory region for the application A2 in the memory M2.

Thereby, based on the frequency of the application, a memory region to be used by an application with a high activation frequency is more preferentially allocated in the memory M1.

The memory management unit 20 may always allocate a memory region for an application associated with a priority of 100, in the memory M1, or may always allocate a memory region for an application associated with a priority of 0, in the memory M2.

(2) Example of Use of Priority for Each File

In this example, the preference information includes association between a file that is placed in the memory 12 and a second priority that is a degree at which a memory region in which the file is placed needs to be preferentially allocated in the memory M1. In that case, when the memory management unit 20 receives the request of the allocation of a memory region in which the file needs to be placed, the memory management unit 20 more preferentially allocates the memory region in the memory M1 as the second priority associated with the file in the preference information is higher. More specifically, the memory management unit 20 allocates a memory region in which a file having a priority equal to or higher than a predetermined threshold is placed, in the memory M1, and allocates a memory region in which a file having a priority lower than the predetermined threshold is placed, in the memory M2.

FIG. 6 is a correspondence table showing correspondence between applications and files to be used by the applications according to the embodiment. FIG. 7 is a correspondence table showing correspondence between files and priorities of the files according to the embodiment. This priority corresponds to the second priority.

FIG. 6 shows files to be used by applications that can operate in the electronic apparatus 1. For example, the application A1 uses four files: "/bin/appl1", "/lib/libc.so", "/lib/libpthread.so", and "/data/meter.dat".

In FIG. 7, (a) shows priorities of the files to be used by the applications that can operate in the electronic apparatus 1. For example, the priority of the file "/bin/appl1" is 80, the priority of the file "/lib/libc.so" is 100, the priority of the file "/lib/libpthread.so" is 90, and the priority of the file "/data/meter.dat" is 70. Further, (b) in FIG. 7 shows that the threshold of the priority is 60.

When the priority for each file and the threshold are set in this way, the memory management unit 20 allocates a memory region for placing a file having a priority equal to or higher than the threshold 60, in the memory M1. On the other hand, the memory management unit 20 allocates a memory region for placing a file having a priority lower than the threshold 60, in the memory M2.

Although the example of the use of the priority for each application and the example of the use of the priority for each file have been described above as the preference information, the preference information having both the characteristics may be used.

A flow of the process in the electronic apparatus 1 configured in this way will be described.

Figure 8:
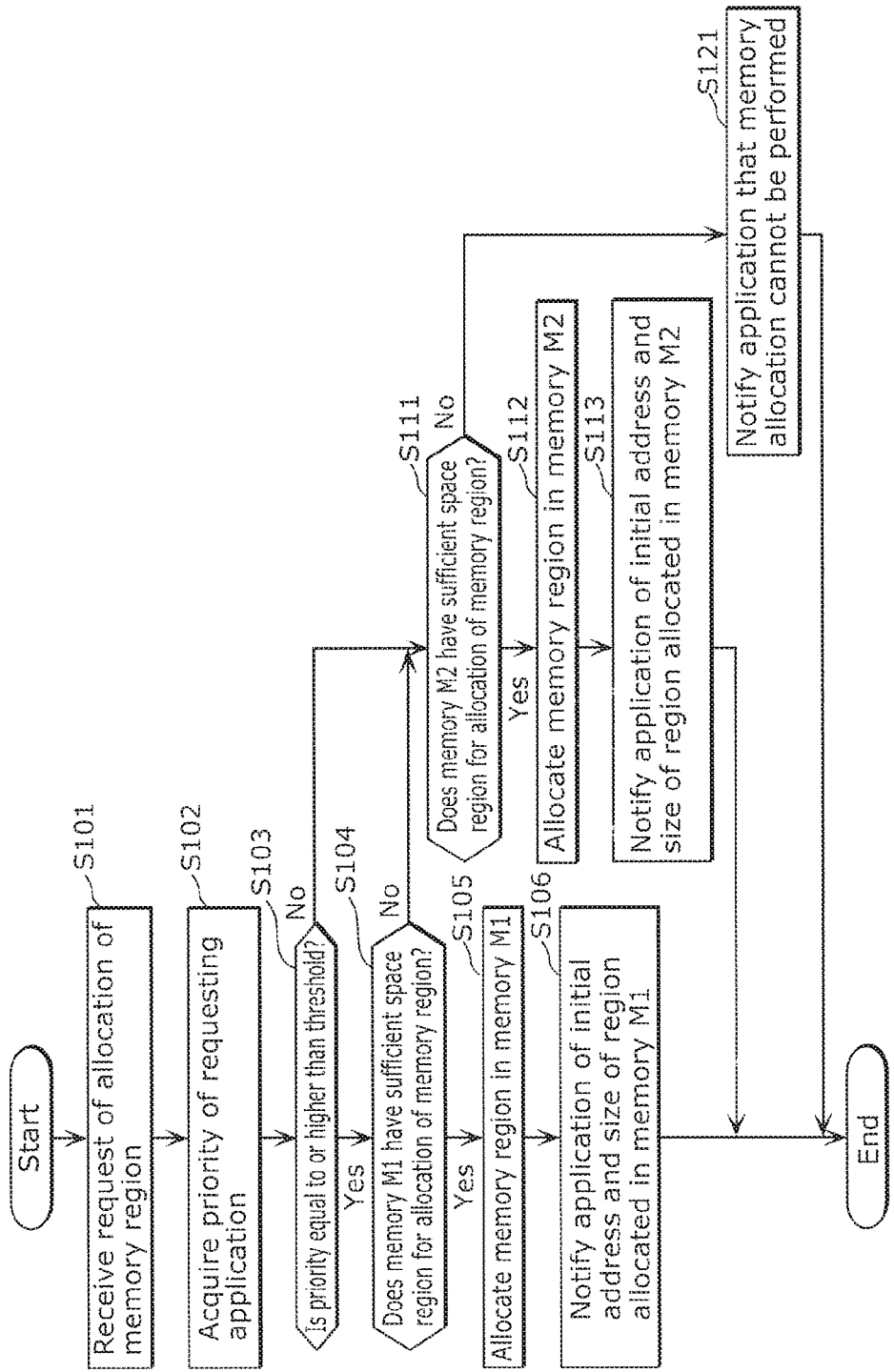
FIG. 8 is a flowchart showing a memory allocation process in the electronic apparatus according to Embodiment 1.

FIG. 8 is a flowchart showing a memory allocation process in the electronic apparatus 1 according to the embodiment. The memory allocation process shown in FIG. 8 is executed, for example, when a new application is activated in the electronic apparatus 1.

As shown in FIG. 8, in step S101, the memory management unit 20 receives the request of the allocation of the memory region, from the application. The request of the memory allocation includes a requested memory size (capacity).

In step S102, the memory management unit 20 acquires the priority of the application as the requestor of the request received in step S101, and the threshold, based on the priority of the memory region for each application and the threshold (see FIG. 4).

In step S103, the memory management unit 20 judges whether the priority is equal to or higher than the threshold, using the priority and threshold acquired in step S102. In the case where the priority is equal to or higher than the threshold (Yes in step S103), the process proceeds to step S104. Otherwise (No in step S103), the process proceeds to step S111.

In step S104, the memory management unit 20 judges whether the memory M1 has a sufficient space region for securing the memory size that is included in the request received in step S101. In the case where there is a sufficient space region (Yes in step S104), the process proceeds to step S105. Otherwise (No in step S104), the process proceeds to step S111.

In step S105, the memory management unit 20 allocates the memory region in the memory M1, in response to the request received in step S101.

In step S106, the memory management unit 20 notifies the application as the requestor of the initial address and size of the region allocated in the memory M1, in response to the request received in step S101.

In step S111, the memory management unit 20 judges whether the memory M2 has a sufficient space region for securing the memory size that is included in the request received in step S101. In the case where there is a sufficient space region (Yes in step S111), the process proceeds to step S112. Otherwise (No in step S111), the process proceeds to step S121.

In step S112, the memory management unit 20 allocates the memory region in the memory M2, in response to the request received in step S101.

In step S113, the memory management unit 20 notifies the application as the requestor of the initial address and size of the region allocated in the memory M2, in response to the request received in step S101.

In step S121, the memory management unit 20 notifies the application that the memory allocation cannot be performed, in response to the request received in step S101.

By the sequence of flow shown in FIG. 8, the memory management unit 20 allocates the memory region for the application that is newly activated, depending on the priority.

Figure 9:
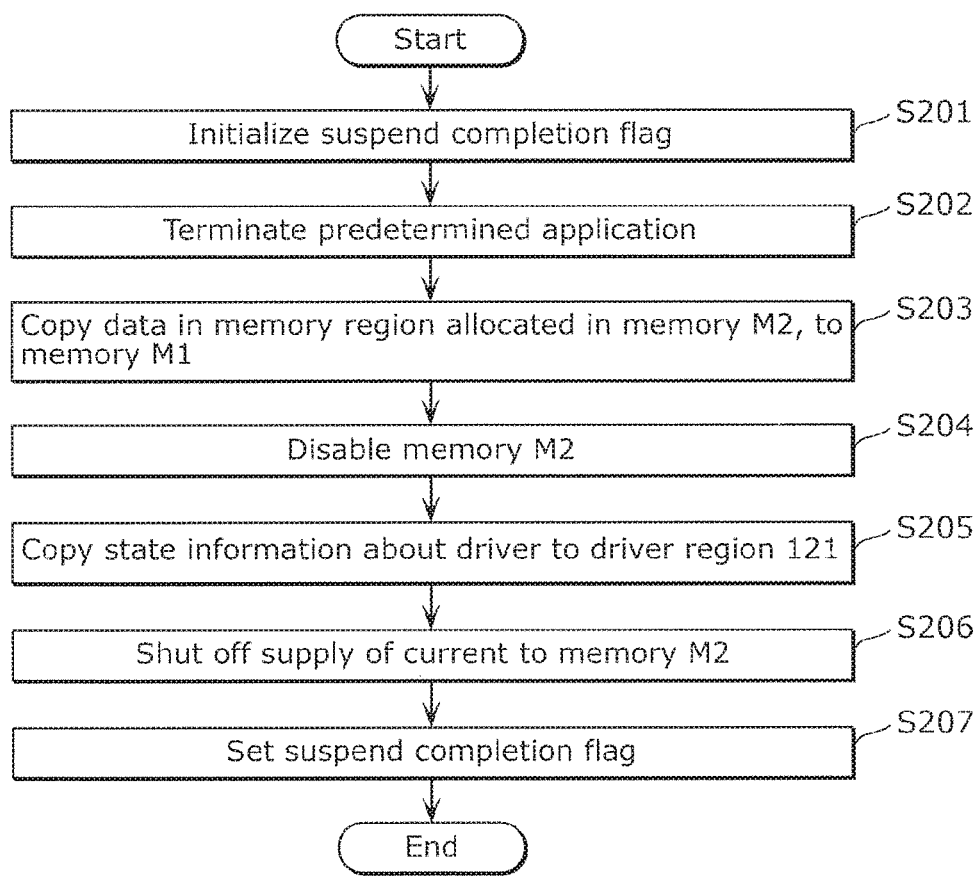
FIG. 9 is a flowchart showing a current shut-off process in the electronic apparatus according to Embodiment 1.

FIG. 9 is a flowchart showing a current shut-off process in the electronic apparatus 1 according to the embodiment. The current shut-off process shown in FIG. 9 is executed at the time of the transition from the on-state to the suspend state.

As shown in FIG. 9, in step S201, the memory management unit 20 initializes the suspend completion flag. The suspend completion flag is a flag for indicating the completion of the transition from the on-state to the suspend state, and corresponds to the completion information.

In step S202, the memory management unit 20 terminates a predetermined application that is operating in the electronic apparatus 1. Thereby, the memory management unit 20 frees the memory region allocated for the terminated application. For example, the predetermined application to be terminated in step S202 is an application for which the activation process is completed in a relatively short time. The predetermined application is activated again, at the time of a subsequent transition from the suspend state to the on-state (step S306 in FIG. 10 described later).

In step S203, the memory management unit 20 copies the data stored in the memory region allocated in the memory M2, to the memory M1.

In step S204, the memory management unit 20 disables the memory M2. Since the memory M2 is disabled, the memory M2 is excluded from the management object of the OS.

In step S205, the memory management unit 20 copies the state information about the driver to the driver region 121.

In step S206, the current control unit 16 shuts off the supply of the current to the memory M2.

In step S207, the memory management unit 20 sets the suspend completion flag.

By the sequence of processes described above, the electronic apparatus 1 shuts off the supply of the current to the memory M2, and transitions from the on-state to the suspend state.

If the sequence of processes shown in FIG. 9 is aborted in the middle due to a drop in power-supply voltage or the like, the electronic apparatus 1 sometimes enters the suspend state while the suspend completion flag is not set. In the above sequence of processes, the suspend completion flag is initialized in step S201 and is set in step S207, and therefore, from the suspend completion flag, it is possible to determine whether the sequence of processes is completed or is aborted in the middle of the sequence of processes.

Figure 10:
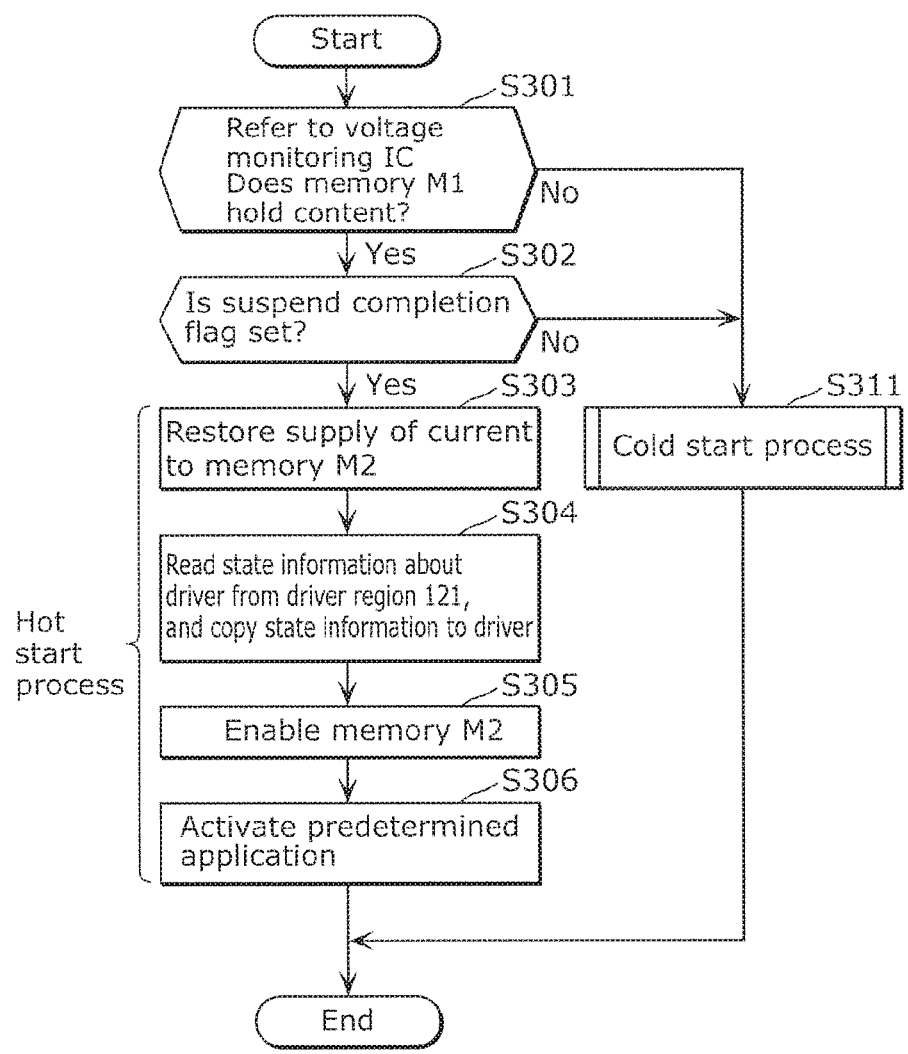
FIG. 10 is a flowchart showing a current restoration process in the electronic apparatus according to Embodiment 1.

FIG. 10 is a flowchart showing a current restoration process in the electronic apparatus 1 according to the embodiment. The current restoration process shown in FIG. 10 is a process that is executed when the electronic apparatus 1 transitions from the suspend state to the on-state after the electronic apparatus 1 transitions to the suspend state by the process in FIG. 9.

As shown in FIG. 10, in step S301, the memory management unit 20 refers to the voltage monitoring IC 17, and judges whether the memory M1 holds the data. Specifically, the memory management unit 20 judges whether the voltage of the power receiving terminal of the memory M1 has been maintained in an appropriate range from the transition to the suspend state (from step S207 of FIG. 9) to the present time point. In the case where the voltage of the power receiving terminal of the memory M1 has been maintained in the appropriate range, it is judged that the memory M1 holds the data. In the case where it is judged that the memory M1 holds the data (Yes in step S301), the process proceeds to step S302. Otherwise (No in step S301), the process proceeds to step S311.

In step S302, the memory management unit 20 judges whether the suspend completion flag is set. In the case where it is judged that the suspend completion flag is set (Yes in S302), the process proceeds to step S303. Otherwise, the process proceeds to step S311.

In step S303, the current control unit 16 restores the supply of the current to the memory M2.

In step S304, the memory management unit 20 reads the state information about the driver, from the driver region 121 in the memory M1, and copies the state information to the driver.

In step S305, the memory management unit 20 enables the memory M2. Since the memory M2 is enabled, the memory M2 is included in the management object of the OS.

In step S306, the memory management unit 20 activates the predetermined application. The predetermined application to be activated is the application terminated in step S202 of FIG. 9.

The process from step S303 to step S306 is a so-called hot start process, which is a process of the transition from the suspend state to the on-state in a short time using the data stored in the memory M1.

In step S311, the electronic apparatus 1 executes a so-called cold start process, which is a process of the transition from the power-off state to the on-state. In the cold start process, the initialization of all memory regions in the memories M1, M2, the activation process for applications, and the like are executed.

The above step S311 is executed, in the case where the supply of the current to the memory M1 is not appropriately performed after the transition to the suspend state, or in the case where the suspend completion flag is not set, that is, in the case where the sequence of processes of the transition from the on-state to the suspend state shown in FIG. 9 is aborted in the middle and where it is not possible to perform the activation process using the data stored in the memory M1. In such a case, the electronic apparatus 1 transitions to the on-state, by the process of the transition from the power-off state to the on-state.

By the sequence of processes described above, the electronic apparatus 1 restores the supply of the current to the memory M2, and transitions from the suspend state to the on-state.

In the technology described above, the current control unit 16 controls the shut-off and restoration of the supply of the current to the memory M2. However, the current control unit 16 may control the shut-off and restoration of the supply of the current, in units of banks in the memory M2. In this case, the memory management unit 20 allocates the memory region in units of banks. Thereby, it is possible to reduce the time required for the transition of the electronic apparatus from the on-state to the suspend state, based on the control of the shut-off and restoration of the supply of the current in units of banks.

As described above, based on the preference information, the electronic apparatus in the embodiment can preferentially allocate the memory region that needs to be allocated in the first memory, to which the supply of the current is not shut off, in the first memory, and the memory region that needs to be allocated in the first memory is restrained from being allocated in the second memory. The shut-off of the supply of the current to the second memory requires time for a process of copying the data stored in the second memory to the first memory, and the like. Therefore, when the supply of the current to the second memory is shut off and the transition to the suspend state is performed, it is possible to reduce the time required for the transition from the on-state to the suspend state, compared to a case where the memory region that needs to be allocated in the first memory is allocated in the second memory. Thus, the electronic apparatus can reduce the time required for the transition from the on-state to the suspend state.

Further, the electronic apparatus allocates, in the first memory, the memory region that needs to be preferentially allocated in the first memory, using the priority determined for each application. Thus, the electronic apparatus can reduce the time required for the transition from the on-state to the suspend state, by controlling the allocation of the memory region for each application.

Further, the electronic apparatus can allocate, in the first memory, the memory region that needs to be preferentially allocated in the first memory, using the priority adjusted depending on the frequency at which the application is activated.

Further, the electronic apparatus allocates, in the first memory, the memory region that needs to be preferentially allocated in the first memory, using the priority determined for each file. Thus, the electronic apparatus can reduce the time required for the transition from the on-state to the suspend state, by controlling the allocation of the memory region for each file.

Further, when the electronic apparatus shuts off the supply of the power to the second memory and transitions from the on-state to the suspend state, the electronic apparatus copies the data stored in the second memory, to the first memory, and therefore, the data stored in the second memory is also maintained after the suspend state. Further, if the data that is desired to be maintained after the suspend state has been already allocated in the first memory based on the preference information, there is also an effect to reduce the time required for the above copy. Thus, the electronic apparatus can maintain a larger volume of data after the suspend state, and can further reduce the time required for the transition from the on-state to the suspend state.

Further, when the electronic apparatus shuts off the supply of the current to the hardware device and thereafter restores the supply of the current to the hardware device, the electronic apparatus can maintain the state before the shut-off. Thus, the electronic apparatus can maintain the state of the hardware device after the suspend state, and can reduce the time required for the transition from the on-state to the suspend state.

Further, the electronic apparatus judges whether the process of the transition to the suspend state is normally completed. When the process is normally completed, the electronic apparatus performs the activation in a short time using the information stored in the first memory, and when the process is not normally completed, the electronic apparatus performs the activation using an ordinary activation process. Therefore, even when the process for the transition from the on-state to the suspend state cannot be normally completed, the electronic apparatus can reduce the time required for the transition from the on-state to the suspend state, while allowing a normal activation after that.

Embodiment 2

In the embodiment, a technology of managing the state in the middle of the current shut-off process in more detail and improving the process at the time of the activation in the electronic apparatus that reduces the time required for the transition from the on-state to the suspend state will be described. Specifically, a suspend completion code that can express a multistage completion state is used instead of the suspend completion flag in Embodiment 1. Further, a plurality of drivers is classified into groups each of which includes one or more drivers, and whether the state of the driver is stored in the memory M1 is managed in units of groups. The suspend completion code corresponds to the completion information.

In the embodiment, before the current control unit 16 shuts off the supply of the current to the controlled hardware device, whenever the memory management unit 20 stores state information indicating states of one or more drivers in the memory M1, the memory management unit 20 stores partial completion information indicating the completion of the storing of the state information, in the memory M1. Then, after the current control unit 16 restores the supply of the current to the controlled hardware device, the memory management unit 20 refers to the partial completion information stored in the memory M1, (a) returns the state information to a driver that is of the plurality of drivers and for which the state information is stored in the memory M1, and (b) initializes a driver that is of the plurality of drivers and for which the state information is not stored in the memory M1.

The description will be made below in detail. Here, as an example, a case where the plurality of drivers belong to three groups G1, G2, G3 will be described, but the present disclosure is not limited to this.

Figure 11:
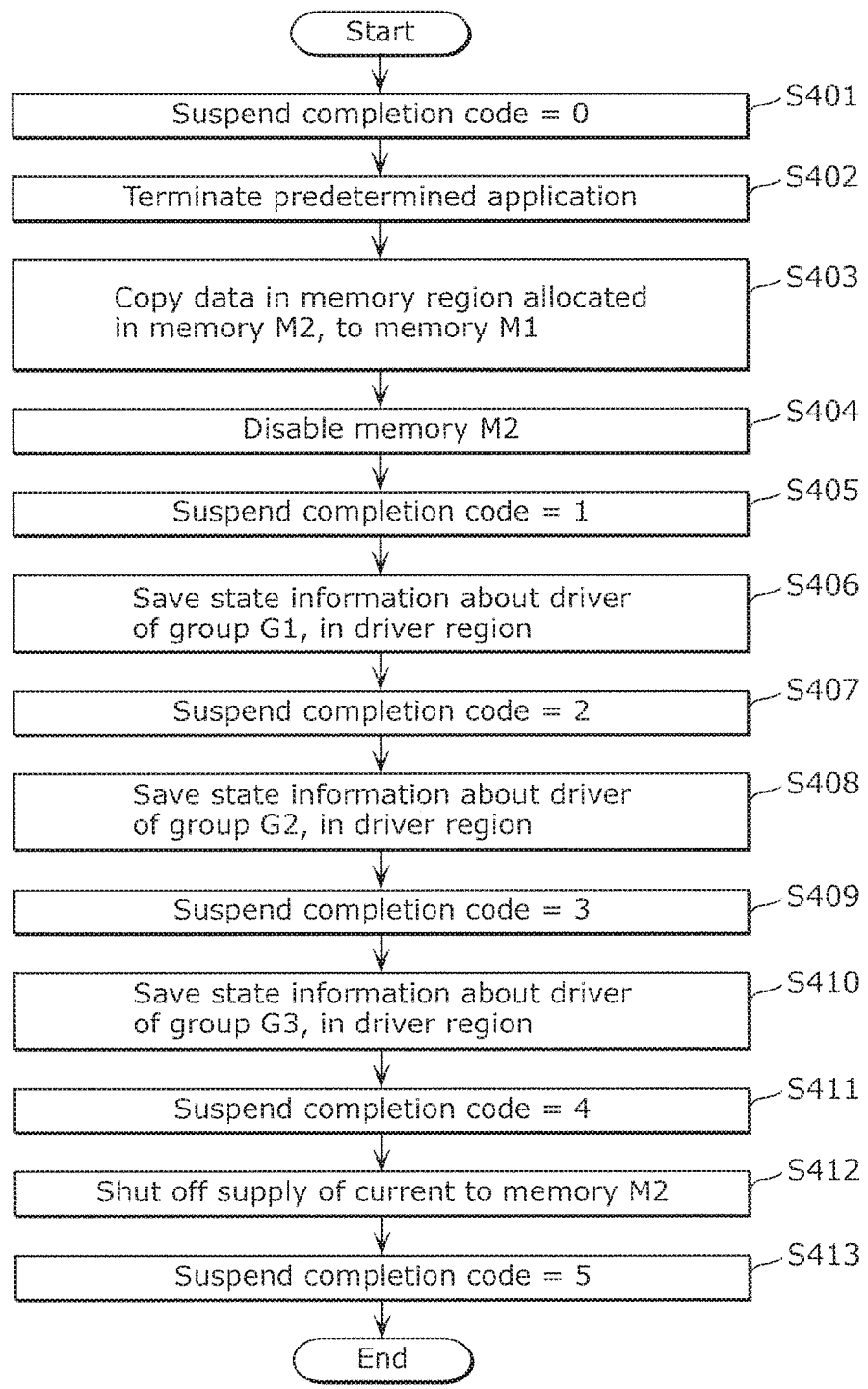
FIG. 11 is a flowchart showing a current shut-off process in an electronic apparatus according to Embodiment 2.

FIG. 11 is a flowchart showing a current shut-off process in the electronic apparatus 1 according to the embodiment. The current shut-off process shown in FIG. 11 is a process that is executed by the electronic apparatus 1 at the time of the transition from the sleep state to the suspend state.

As shown in FIG. 11, in step S401, the memory management unit 20 initializes the suspend completion code by setting the suspend completion code to 0.

In step S402, the memory management unit 20 terminates the predetermined application that is operating in the electronic apparatus 1. This process is the same as the process in step S202 of FIG. 9.

In step S403, the memory management unit 20 copies the data stored in the memory region allocated in the memory M2, to the memory M1.

In step S404, the memory management unit 20 disables the memory M2.

In step S405, the memory management unit 20 sets the suspend completion code to 1.

In step S406, the memory management unit 20 copies the state information about the driver belonging to the group G1, to the driver region in the memory M1.

In step S407, the memory management unit 20 sets the suspend completion code to 2.

In step S408, the memory management unit 20 copies the state information about the driver belonging to the group G2, to the driver region in the memory M1.

In step S409, the memory management unit 20 sets the suspend completion code to 3.

In step S410, the memory management unit 20 copies the state information about the driver belonging to the group G3, to the driver region in the memory M1.

In step S411, the memory management unit 20 sets the suspend completion code to 4.

In step S412, the current control unit 16 shuts off the supply of the current to the memory M2.

In step S413, the memory management unit 20 sets the suspend completion code to 5.

If the sequence of processes shown in FIG. 11 is aborted in the middle due to a drop in power-supply voltage or the like, the suspend completion code is set differently depending on the time point of the abort. Accordingly, there are advantages in that it is possible to determine the time point of the abort of the sequence of processes, in a recovery process that is subsequently performed, and in that it is possible to perform a necessary process for the recovery and to restrain an unnecessary process from being performed.

Figure 12:
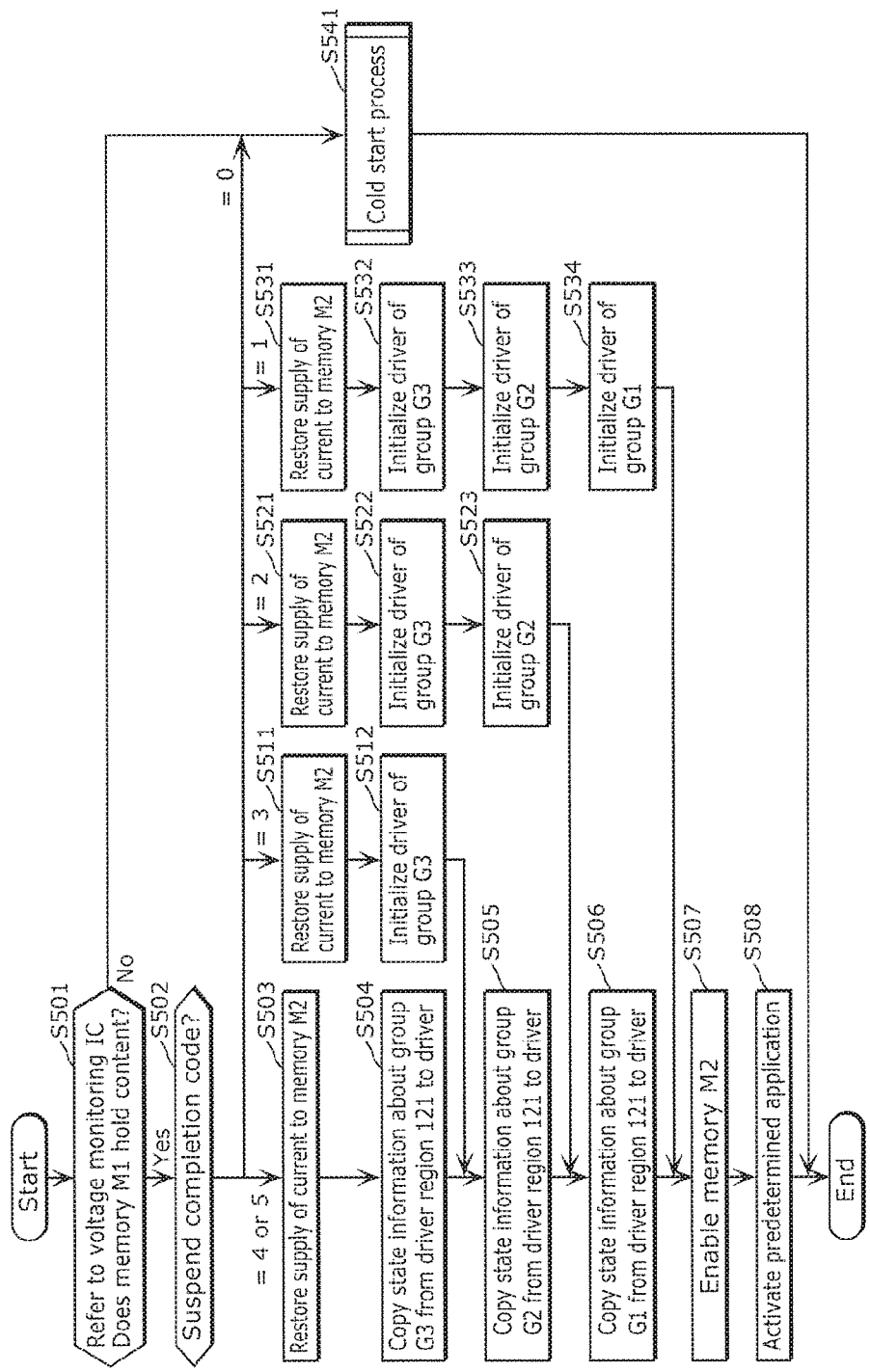
FIG. 12 is a flowchart showing a current restoration process in the electronic apparatus according to Embodiment 2.

FIG. 12 is a flowchart showing a current restoration process in the electronic apparatus 1 according to the embodiment. The current restoration process shown in FIG. 12 is a process that is executed when the electronic apparatus 1 transitions from the suspend state to the on-state after the transition to the suspend state by the process in FIG. 11.

As shown in FIG. 12, is step S501, the memory management unit 20 refers to the voltage monitoring IC 17, and judges whether the memory M1 holds the data. This process is the same as the process in step S301.

In step S502, the memory management unit 20 branches the process depending on the value of the suspend completion code. In the case where the suspend completion code is 4 or 5 ("=4 or 5" in step S502), the process proceeds to step S503. In the case where the suspend completion code is 3 ("=3" in step S502), the process proceeds to step S511. In the case where the suspend completion code is 2 ("=2" in step S502), the process proceeds to step S521. In the case where the suspend completion code is 1 ("=1" in step S502), the process proceeds to step S531. In the case where the suspend completion code is 0 ("=0" in step S502), the process proceeds to step S541.

In step S503, the current control unit 16 restores the supply of the current to the memory M2.

In step S504, the memory management unit 20 reads the state information about the driver belonging to the group G3, from the driver region 121 in the memory M1, and copies the state information to the driver.

In step S505, the memory management unit 20 reads the state information about the driver belonging to the group G2, from the driver region 121 in the memory M1, and copies the state information to the driver.

In step S506, the memory management unit 20 reads the state information about the driver belonging to the group G1, from the driver region 121 in the memory M1, and copies the state information to the driver.

In step S507, the memory management unit 20 enables the memory M2.

In step S508, the memory management unit 20 activates a predetermined application.

In step S511, the current control unit 16 restores the supply of the current to the memory M2.

In step S512, the memory management unit 20 initializes the driver belonging to the group G3. After step S512, the process proceeds to step S505.

In step S521, the current control unit 16 restores the supply of the current to the memory M2.

In step S522, the memory management unit 20 initializes the driver belonging to the group G3.

In step S523, the memory management unit 20 initializes the driver belonging to the group G2. After step S523, the process proceeds to step S506.

In step S531, the current control unit 16 restores the supply of the current to the memory M2.

In step S532, the memory management unit 20 initializes the driver belonging to the group G3.

In step S533, the memory management unit 20 initializes the driver belonging to the group G2.

In step S534, the memory management unit 20 initializes the driver belonging to the group G1. After step S534, the process proceeds to step S507.

In step S541, the electronic apparatus 1 executes the so-called cold start process, which is a process of the transition from the power-off state to the on-state. Step S541 is executed, in the case where the supply of the current to the memory M1 is not appropriately performed after the transition to the suspend state, or in the case where the suspend completion code is 0, that is, in the case where the process is aborted in a period after step S401 shown in FIG. 11 and before step S405. In this case, it is not possible to perform the activation process using the data stored in the memory M1. In such a case, the electronic apparatus 1 transitions to the on-state, by the process of the transition from the power-off state to the on-state.

In the case where the above hardware device is realized as a part of a SoC (System on Chip) and where the current control unit 16 maintains the supply of the current to a register part of the SoC, the control in the embodiment is unnecessary.

As described above, the electronic apparatus in the embodiment judges whether processes of the transition to the suspend state are normally completed at a plurality of time points. For a process that is normally completed, the electronic apparatus recovers the state of the hardware device in a short time using the information stored in the first memory, and for a process that is not normally completed, the electronic apparatus performs the activation using an ordinary activation process. Therefore, even when there is a process that cannot be normally completed in the processes for the transition from the on-state to the suspend state, the electronic apparatus can reduce the time required for the transition from the on-state to the suspend state, while activating only the process using the ordinary activation process.

Embodiment 3

In the embodiment, a technology of reducing the time required for the transition from the on-state to the suspend state in the case where an application allocates the memory region across a plurality of memories in the electronic apparatus that reduces the time required for the transition from the on-state to the suspend state will be described.

Figure 13:
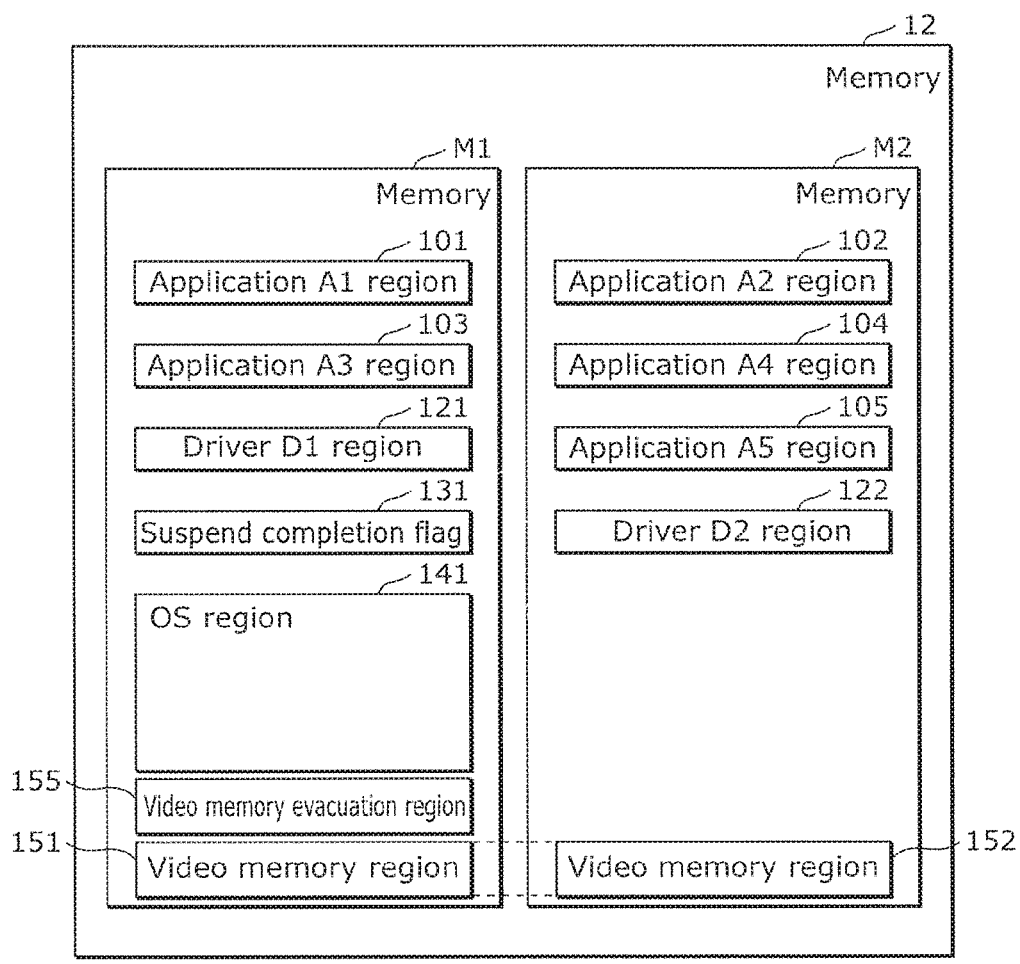
FIG. 13 is an explanatory diagram for memory regions in an electronic apparatus according to Embodiment 3.

FIG. 13 is an explanatory diagram for memory regions in an electronic apparatus 1 according to Embodiment 3. In FIG. 13, similarly to FIG. 3 in Embodiment 1, the region 101 for the application A1 and the like are allocated in the memory M1, and the region 102 for the application A2 and the like are allocated in the memory M2. Further, a video memory region is allocated across the memories M1, M2. Specifically, a video memory region 151 is allocated in the memory M1, and a video memory region 152 is allocated in the memory M2.

A process when the supply of the current to the memory M2 is shut off in such a case will be described. Specifically, before the shut-off of the supply of the current to the memory M2, the memory management unit 20 evacuates the data stored in the video memory region 152, by copying the data to a video memory evacuation region 155 in the memory M1. Then, after the restoration of the supply of the current to the memory M2, the memory management unit 20 copies the data stored in the video memory evacuation region 155, to the video memory region 152.

Figure 14:
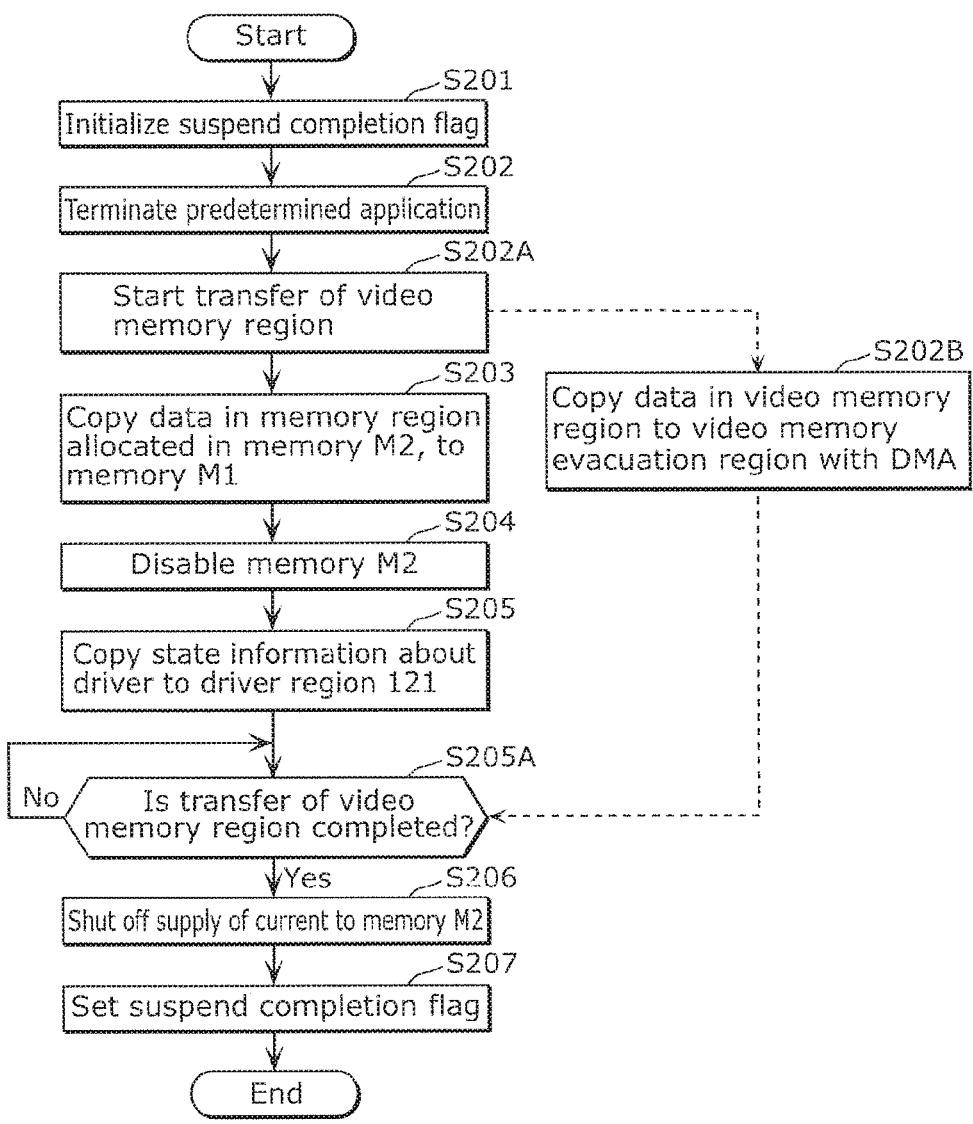
FIG. 14 is a flowchart showing a current shut-off process in the electronic apparatus according to Embodiment 3.

FIG. 14 is a flowchart showing a current shut-off process in the electronic apparatus 1 according to the embodiment. In the flowchart of FIG. 14, the same processes as those in the flowchart of FIG. 9 are denoted by the same reference characters, and the detailed descriptions are omitted.

After the initialization of the suspend completion flag and the termination of the predetermined application (step S201 and S202), the memory management unit 20 starts to copy the data stored in the video memory region 152 within the memory M2, to the video memory evacuation region 155 (step S202A). Here, the copy of the data stored in the video memory region 152 may be the copy with DMA (Direct Memory Access). In this case, the memory management unit 20 instructs a DMA controller (not illustrated) to start the copy. In response to the instruction, the DMA controller performs the copy (step S202B). In the case of using the copy with the DMA, there is an advantage in that the CPU 11 can perform another information processing during the copy. As the above copy, the copy with the CPU 11 may be used.

Then, the memory management unit 20 copies the data stored in the memory region allocated in the memory M2, to the memory M1, disables the memory M2, and copies the state information about the driver (step S203, step S204, and step S205).

Next, the memory management unit 20 judges whether the copy of the data stored in the video memory region 152 is completed, and waits in step S205A until the completion of the copy.

Thereafter, the current control unit 16 shuts off the supply of the current to the memory M2, and the memory management unit 20 sets the suspend completion flag (step S206 and step S207).

Figure 15:
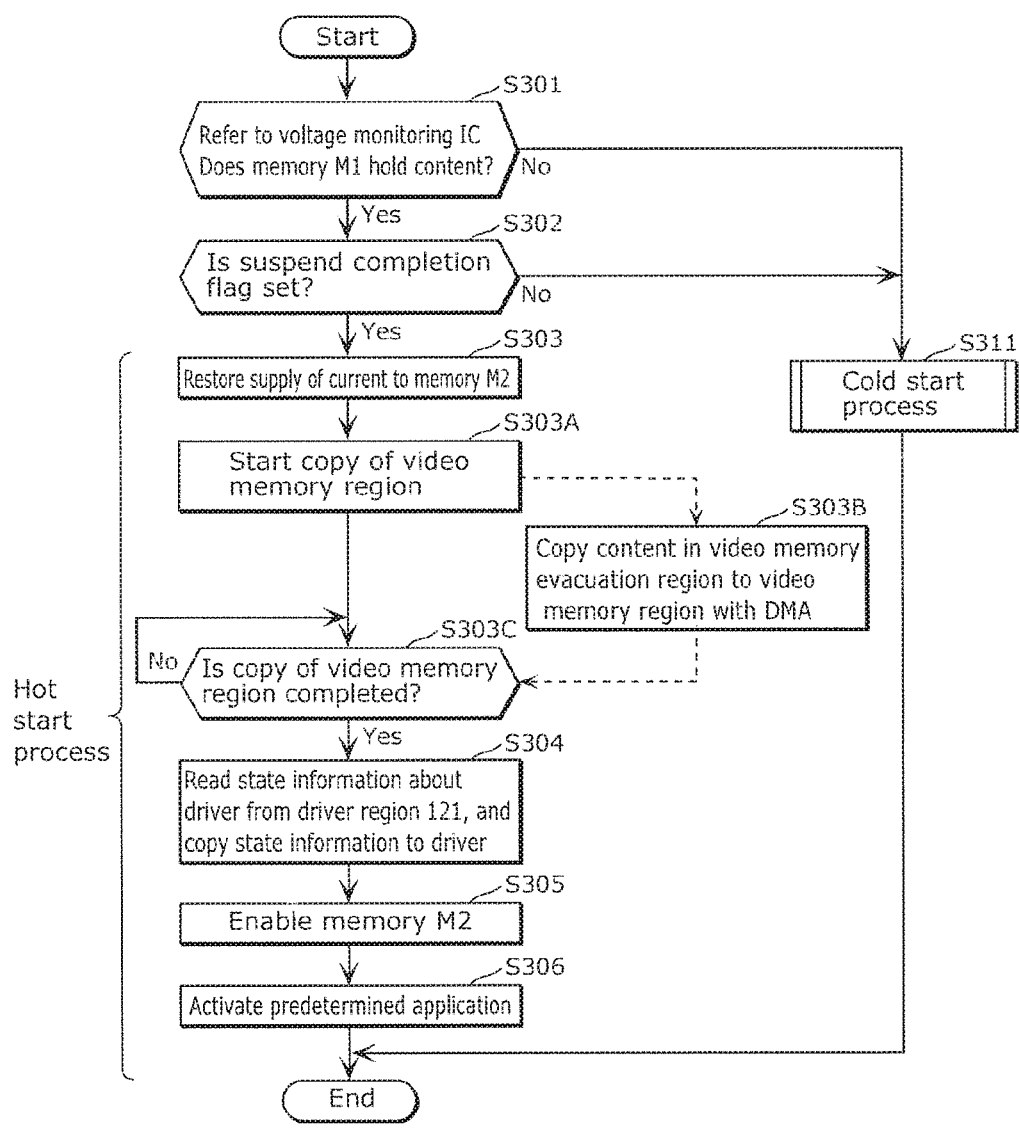
FIG. 15 is a flowchart showing a current restoration process in the electronic apparatus according to Embodiment 3.

FIG. 15 is a flowchart showing a current restoration process in the electronic apparatus 1 according to the embodiment. In the flowchart of FIG. 15, the same processes as those in the flowchart of FIG. 10 are denoted by the same reference characters, and the detailed descriptions are omitted.

The memory management unit 20 judges whether the memory M1 holds the data, judges whether the suspend completion flag is set, and restores the supply of the current to the memory M2 (step S301, step S302, and step S303).

The memory management unit 20 starts to copy the data stored in the video memory evacuation region 155 within the memory M1, to the video memory region 152 (step S303A). Here, the copy of the data stored in the video memory evacuation region 155 may be the copy with the DMA. In this case, the memory management unit 20 instructs the DMA controller to start the copy. In response to the instruction, the DMA controller performs the copy (step S308B).

Next, the memory management unit 20 judges whether the copy of the data stored in the video memory evacuation region 155 is completed, and waits in step S303C until the completion of the copy.

In the case where the process of step S303B is performed by the DMA, the process of step S303B can be performed in parallel with the process of step S304. That is, step S304 may be executed before step S303C. Thereby, it is possible to reduce the time required for the above sequence of processes.

As described above, the electronic apparatus in the embodiment can maintain the memory region allocated across two or more non-volatile memories including the second memory, after the suspend state. Thus, the electronic apparatus can maintain the memory region allocated across two or more non-volatile memories, after the suspend state, and can reduce the time required for the transition from the on-state to the suspend state. Further, the copy of the data may be performed by DMA (Direct Memory Access). Thereby, the processing load on the CPU decreases, allowing the reduction in the time required for the activation process.

Embodiment 4

In the embodiment, a technology of further reducing power consumption by the transition from the suspend state to the power-off state in the electronic apparatus that reduces the time required for the transition from the on-state to the suspend state will be described.

An electronic apparatus 1 according to the embodiment estimates the time point when the next operation of the electronic apparatus 1 is started, using a history of operating times of the electronic apparatus 1. In the case where the time to that time point is relatively long, the electronic apparatus 1 transitions to the power-off state, and thereby, further reduces power consumption.

Specifically, the memory management unit 20 estimates an estimated on time point that is a time point when the electronic apparatus 1 transitions from the off-state to the on-state after the present time point. The current control unit 16 performs the control to shut off the supply of the current to the memory M2, when the time length from the present time point to the estimated on time point is longer than a predetermined length, and performs the control to restore the supply of the current to the memory M2, when the time length from the present time point to the estimated on time point is shorter than a predetermined length.

FIG. 16 is an explanatory diagram showing a history of operating times of the electronic apparatus 1 according to the embodiment.

The memory management unit 20 acquires the operating time of the electronic apparatus 1, and holds it as a history. FIG. 16 shows an example of the history of the operating time.

For example, FIG. 16 shows that the operation of the electronic apparatus 1 was started at a time "6:04" on a date "Feb. 1, 2018" and the operation was ended at a time "20:04" on the same date.

Figure 17:
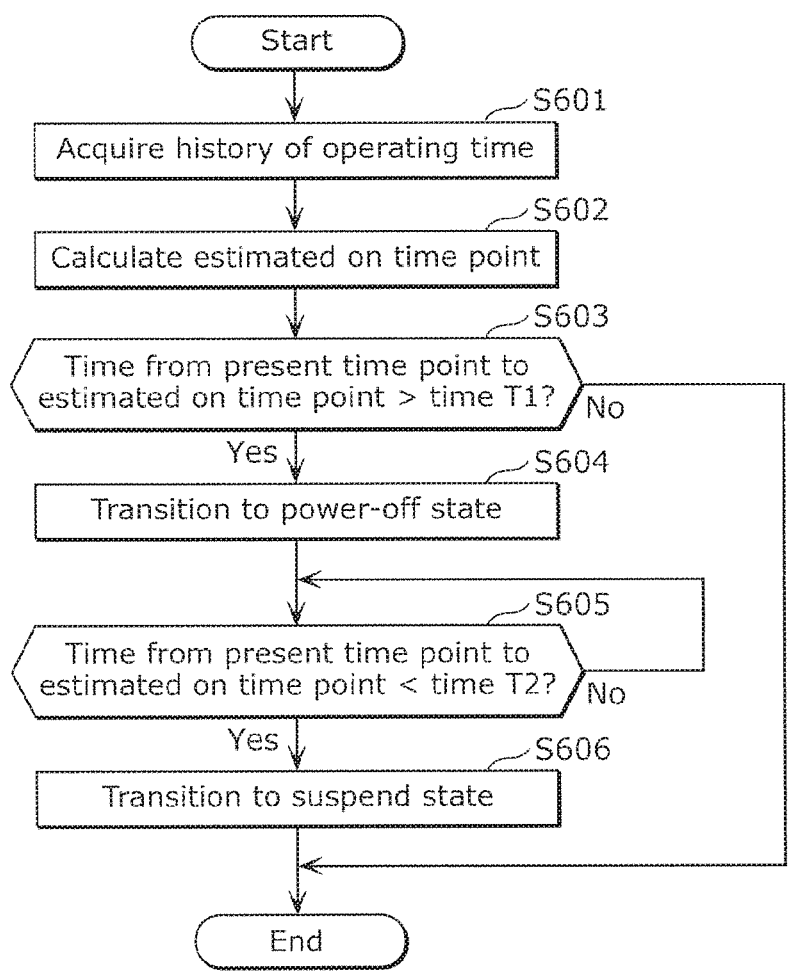
FIG. 17 is an explanatory diagram showing a process relevant to a state transition of the electronic apparatus according to Embodiment 4.

FIG. 17 is an explanatory diagram showing a process relevant to a state transition of the electronic apparatus 1 according to the embodiment.

As shown in FIG. 17, in step S601, the memory management unit 20 acquires the history of the operating time of the electronic apparatus 1.

In step S602, the memory management unit 20 estimates the time point when the next operation of the electronic apparatus 1 is started, based on the history of the operating time acquired in step S601. This time point is also referred to as the estimated on time point.

In step S603, the memory management unit 20 judges whether the time from the present time point to the estimated on time point is longer than a previously determined time T1. In the case where the time from the present time point to the estimated on time point is longer than the time T1 (Yes in step S603), the process proceeds to step S604. Otherwise (No in step S603), the sequence of processes shown in FIG. 17 ends.

In step S604, the memory management unit 20 transitions to the power-off state.

In step S605, the memory management unit 20 judges whether the time from the present time point to the estimated on time point is shorter than a previously determined time T2. In the case where the time from the present time point to the estimated on time point is shorter than the time T2 (Yes in step S605), the process proceeds to step S606. Otherwise (No in step S605), the memory management unit 20 executes step S605 again. That is, the memory management unit 20 waits in step S605 until the time from the present time point to the estimated on time point becomes shorter than the time T2.

In step S606, the memory management unit 20 transitions to the suspend state.

Thus, the transition from the suspend state to the power-off state has an advantage in that it is possible to avoid the problem of memory leak.

As described above, when it is estimated that the activation of the electronic apparatus is maintained in the suspend state for a relatively long time, the electronic apparatus in the embodiment adopts the power-off state once, and thereby, reduces the consumed power. Further, since the electronic apparatus adopts the power-off state once, even if an application has a defect such as memory leak, it is possible to restrain the influence thereof and to normally perform the operation after that. Therefore, the electronic apparatus can further reduce the consumed power, and can reduce the time required for the transition from the on-state to the suspend state while avoiding the influence of the memory leak or the like.

It should be noted that, in each of the above-described embodiments, each of the constituent elements may be implemented into a dedicated hardware or implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program. Here, software for implementing the electronic device or the like according to each of the embodiments includes the following programs.

This program causes a computer to execute a control method for an electronic apparatus including a plurality of volatile memories that include a first memory and a second memory. The control method includes: performing a control to shut off supply of current to the second memory; and allocating a memory region in either the first memory or the second memory based on preference information indicating a memory region that needs to be preferentially allocated in the first memory.

Although the electronic device and the like according to one or more aspects have been described based on the above embodiments, the present discloser is not limited to the embodiments. Those skilled in the art will be readily appreciated that various modifications and combinations of the constituent elements and functions in the embodiments are possible without materially departing from the novel teachings and advantages of the present disclosure.

Although the present disclosure has been described and illustrated in detail, it is clearly understood that the same is by way of example only and is not to be taken by way of limitation, the scope of the present disclosure being limited only by the terms of the appended claims.

INDUSTRIAL APPLICABILITY

The present disclosure can be used for an electronic apparatus that reduces the time required for the transition from the on-state to the suspend state. Specifically, the present disclosure can be used for an infotainment system in a vehicle.

The invention claimed is:

1. An electronic apparatus comprising:
  a plurality of volatile memories that include a first memory and a second memory;
  a current control circuit that performs a control to shut off supply of current to the second memory; and
  a memory management circuit that allocates a memory region in either the first memory or the second memory based on a first threshold and preference information indicating a memory region that needs to be preferentially allocated in the first memory,
  wherein
  the preference information includes association between an application and a first priority, the application operating using the plurality of the volatile memories, the first priority being a degree at which a memory region to be used by the application needs to be preferentially allocated in the first memory,
  the memory management circuit acquires a frequency at which the application is activated,
  the memory management circuit calculates an adjusted first priority using the first priority associated with the application in the preference information and the frequency at which the application is activated, and calculates an adjusted first threshold using the first threshold and the frequency at which the application is activated, and
  when the memory management circuit receives a request of allocation of the memory region from the application, the memory management circuit allocates the memory region in the first memory if the adjusted first priority associated with the application in the preference information is higher than the adjusted first threshold.

2. The electronic apparatus according to claim 1, wherein:
  the preference information includes association between a file and a second priority, the file being placed in the plurality of the volatile memories, the second priority being a degree at which a memory region in which the file is placed needs to be preferentially allocated in the first memory; and
  when the memory management circuit receives a request of allocation of the memory region in which the file needs to be placed, the memory management circuit more preferentially allocates the memory region in the first memory if the second priority associated with the file in the preference information is higher than a second threshold.

3. The electronic apparatus according to claim 1, wherein the memory management circuit copies data stored in the second memory, to the first memory, before the current control circuit shuts off the supply of the current to the second memory.

4. The electronic apparatus according to claim 1, wherein when the memory management circuit allocates the memory region across two or more non-volatile memories including the second memory of the plurality of the volatile memories, the memory management circuit copies data stored in a partial region, to the first memory, before the current control circuit shuts off the supply of the current to the second memory, the partial region being a region of the memory region allocated and being included in the second memory.

5. The electronic apparatus according to claim 1, wherein:
the current control circuit further performs a control to shut off supply of current to a controlled hardware device, the controlled hardware device being a previously determined hardware device of one or more hardware devices included in the electronic apparatus; and
the memory management circuit further
stores state information in the first memory, before the current control circuit shuts off the supply of the current to the controlled hardware device, the state information indicating a state of a driver that controls the controlled hardware device, and
copies the state information to the driver, after the current control circuit restores the supply of the current to the controlled hardware device.

6. The electronic apparatus according to claim 5, wherein the memory management circuit further
stores completion information in the first memory, before the current control circuit shuts off the supply of the current to the controlled hardware device, the completion information indicating completion of the storing of the state information, and
copies the state information to the driver when it is judged that the completion information is stored in the first memory, after the current control circuit restores the supply of the current to the controlled hardware device.

7. The electronic apparatus according to claim 5, wherein:
the memory management circuit further
stores partial completion information in the first memory whenever the memory management circuit stores state information in the first memory, before the current control circuit shuts off the supply of the current to the controlled hardware device, the state information indicating states of one or more drivers of a plurality of the drivers, the partial completion information indicating completion of the storing of the state information; and
the memory management circuit
refers to the partial completion information stored in the first memory,
(a) returns the state information to a driver that is of the plurality of the drivers and for which the state information is stored in the first memory, and
(b) initializes a driver that is of the plurality of the drivers and for which the state information is not stored in the first memory,
after the current control circuit restores the supply of the current to the controlled hardware device.

8. The electronic apparatus according to claim 1, wherein:
the electronic apparatus further comprises an operation circuit that receives an operation to cause the electronic apparatus to transition from an off-state to an on-state, from a user;
the memory management circuit further estimates an estimated on time point, the estimated on time point being a time point when the electronic apparatus transitions from the off-state to the on-state after a present time point; and
the current control circuit further
performs the control to shut off the supply of the current to the second memory, when a time length from the present time point to the estimated on time point is longer than a predetermined length, and
performs a control to restore the supply of the current to the second memory, when the time length from the present time point to the estimated on time point is shorter than a predetermined length.

9. A control method for an electronic apparatus including a plurality of volatile memories that include a first memory and a second memory, the control method comprising:
performing a control to shut off supply of current to the second memory; and
allocating a memory region in either the first memory or the second memory based on a first threshold and preference information indicating a memory region that needs to be preferentially allocated in the first memory, wherein
the preference information includes association between an application and a first priority, the application operating using the plurality of the volatile memories, the first priority being a degree at which a memory region to be used by the application needs to be preferentially allocated in the first memory,
acquiring a frequency at which the application is activated,
calculating an adjusted first priority using the first priority associated with the application in the preference information and the frequency at which the application is activated,
calculating an adjusted first threshold using the first threshold and the frequency at which the application is activated, and
when receiving a request of allocation of the memory region from the application, allocating the memory region in the first memory if the adjusted first priority associated with the application in the preference information is higher than the adjusted first threshold.

* * * * *